United States Patent [19]
Rendall et al.

[11] Patent Number: 5,865,952
[45] Date of Patent: Feb. 2, 1999

[54] PROCESS FOR MAKING BASIC SODIUM AND/OR POTASSIUM ALUMINUM SULPHATES AND FOR MAKING PAPER WITH SUCH

[75] Inventors: John S. Rendall; Massoud Ahghar, both of Albuquerque, N. Mex.

[73] Assignee: Solv-Ex Corporation, Albuquerque, N. Mex.

[21] Appl. No.: 74,630

[22] Filed: May 7, 1998

Related U.S. Application Data

[62] Division of Ser. No. 703,883, Aug. 27, 1996, Pat. No. 5,783,163.

[51] Int. Cl.$^6$ .................................................. D21H 17/66
[52] U.S. Cl. ........................................ 162/181.3; 162/158
[58] Field of Search ............................ 423/556; 162/158, 162/181.3

[56] References Cited

U.S. PATENT DOCUMENTS

| | | | |
|---|---|---|---|
| 1,538,837 | 5/1925 | Myham | 423/556 |
| 1,964,389 | 6/1934 | Stewart . | |
| 4,388,208 | 6/1983 | Gytel | 162/181.3 |
| 4,394,368 | 7/1983 | Shawks | 423/557 |
| 4,526,763 | 7/1985 | Barlett et al. | 423/112 |
| 5,149,400 | 9/1992 | Haase et al. | 162/181.3 |
| 5,167,766 | 12/1992 | Huwig et al. | 162/641.1 |
| 5,258,168 | 11/1993 | Misra et al. | 123/556 |
| 5,482,585 | 1/1996 | Harrington, IV et al. | 162/181.3 |
| 5,601,921 | 2/1997 | Eriksson | 162/181.3 |
| 5,783,163 | 7/1998 | Rendall et al. | 423/556 |

FOREIGN PATENT DOCUMENTS 0275851 7/1988 European Pat. Off. ............. 162/181.3

*Primary Examiner*—Gary P. Straub
*Attorney, Agent, or Firm*—Thomas E. Schatzel; Law Offices Of Thomas E. Schatzel, A Prof. Corporation

[57] ABSTRACT

A process in which a leach liquor of $Al_2(SO_4)_3 + K_2SO_4 + Fe_2SO_4$ and other sulphates is introduced to a surface-cooled crystallizer that drops the $Al_2(SO_4)_3 + 18H_2O$. The leach liquor is pumped through a heat exchanger that keeps a temperature of 160° F. and the surface temperature of the surface-cooled crystallizer is maintained at 60° F. The temperature gradient within the leach liquor promotes crystal formation. These crystals are then supplied to mixture which includes $K_2SO_4$ in a simple crystallization and evaporation step that uses a vacuum of twenty inches of mercury and heat to drop $Al_2(SO_4)_3 + K_2SO_4 + 24H_2O$. A pressure of 250 PSI and a temperature of 200° C. are then applied in a discrete continuous process that yield a basic sodium or potassium aluminum sulphate and excess sodium sulphate or potassium. The excess sodium sulphate or potassium sulphate is returned to the simple crystallization and evaporation step. The basic sodium aluminum sulphate comprises particles that are at least forty percent below two micron. This is then applied to a delaminator that converts eighty-five percent of the particles to under two micron. The BKAS and/or BNaAS is used as a filler in the making of paper.

7 Claims, 2 Drawing Sheets

PROCESS FOR MAKING BASIC SODIUM AND/OR POTASSIUM ALUMINUM SULPHATES AND FOR MAKING PAPER WITH SUCH

This is a divisional of application Ser. No. 08/703,883 filed on Aug. 27, 1996, U.S. Pat. No. 5,783,163.

BACKGROUND OF THE INVENTION

1. Field of the Invention

The invention relates generally to the production of basic sodium and/or potassium aluminum sulphate from leach liquors of aluminum and sodium/potassium sulphates and to methods for producing newsprint with fillers and coatings of such aluminum and sodium/potassium sulphates.

2. Description of the Prior Art

Those who have handled, while reading, a magazine are likely aware of the amount of clay fillers and coating as well as the variation in the type and amount of such clay that was used in producing the magazine. Ash content can vary significantly from lightly coated (eight to twelve percent) publications to high quality, heavily coated (twenty-five to thirty percent) publications. The type and quality of coatings can also vary between cheaper magazines and high quality magazines such as The National Review, Scientific American, Playboy and the Smithsonian. Colored financial grades, such as typical checks and business forms, and the many different types of stationery and writing papers in use, generally contain around ten percent ash. This includes filler clay added to produce a smoother, higher opacity sheet, and such ash particles included are usually fairly small. Another waste grade is coated art books displayed often on coffee tables, which can easily contain twenty to thirty percent ash, mostly in the form of clay for coatings as well as pigments such as titanium dioxide.

Paper can be made with bleached or unbleached chemical pulps, mechanical pulps, chemi-mechanical pulps, or recycled pulps. It can include conventional additives such as sizing agents, fillers such as titanium dioxide, calcium carbonate, kaolin clay, or talc, and polymeric additives such as wet strength resins, polyamines or polyamide-amines, or polyacrylamide polymers or copolymers of acrylamide.

Non-cellulose coatings, filler clay and other products are added during paper manufacture or deposited on paper surfaces during processing or applied to paper in converting or printing operations to enhance a number of different characteristics, e.g., smoothness, printability, gloss, durability and paper protection. The range of formulation of the various materials varies greatly depending on the intended function of the paper. These can range from simple filler clay particles to tenacious chemicals and pigments. The amount of this material can vary from one percent to as high as fifty percent of the overall dry weight.

Basic paper pulp includes ground wood pulp, thermo-mechanical pulp, semi-chemical pulp, recycled mechanical pulps produced by de-inking of newspaper or magazines containing these pulps, etc. Such pulps are used singly or are mixed into a variety of well-known combinations. Within certain limits, a small amount of chemical pulp can be added to adjust the optical properties without adversely affecting the physical properties of the mechanical pulps.

Various pigments are commonly used for a filler, e.g., clay, talc, titanium dioxide, white carbon, calcium carbonates and urea resin fine particles, e.g., one-half to ten percent, by weight, that are added to the whole. Less than one-half percent usually causes poor opacity or oil absorption problems, and more than ten percent reduces the tensile strength or tear strength of the final paper product. Titanium dioxide is a relatively expensive material, and so is used sparingly.

Needle-shaped pigments are often used in coating layer pigments and include satin white, needle-form precipitated calcium carbonate, and Hong Kong kaolin. These pigments are mixed with binders and applied on the base paper as the coating color. Binders, for example, styrene butadiene latex, starch and starch derivatives, polyvinyl alcohol and cellulose derivatives are commonly used. However, the invention is not so, and several binders which are used as binders for paper making can be used, alone or in mixed form. The kinds and formulation ratios of binders affect the surface strength and absorptiveness of the pigments.

Conventional pigments include various kinds of silicon dioxide, activated clay, calcined clay, fine magnesium carbonate, various kinds of silicate, diatomaceous earth, urea resin powder, kaolin, talc, various kinds of calcium carbonate, titanium dioxide, and zinc white. Pigments with low oil absorption properties are used in mixtures with other pigments that have high oil absorption characteristics. Low oil absorptiveness pigments allow the coating color to be controlled better.

Kaolin clay, the crystal form of which is rhombohexagonal (hexagonal plate), is usually used as a major pigment for the coating layer of common coated paper. Because of the crystal form of kaolin clay, kaolin particles have a tendency to be in the parallel orientation under the smoothing treatment, and to give a highly glossy surface.

Paper and paper board are typically made from "thin stock", a dilute aqueous suspension of cellulose fibers. Alternatively, the thin stock is passed through one or more shear stages, such as cleaning, mixing and pumping stages, and the resultant suspension is drained through a wire to form a sheet, which is then dried. The thin stock is generally made by dilution of a thick stock that is formed earlier in the process. The drainage to form the sheet may be downwards under gravity or may be upwards, and the screen through which drainage occurs may be flat or curved, e.g., cylindrical.

It is common to include various inorganic materials, such as bentonite and alum, and/or organic materials, such as various natural or modified natural or synthetic polymers, in the thin stock for the purpose of improving the process. Such materials can be added for diverse purposes such as pitch control, de-coloration of the drainage water or for facilitating release from drying rolls. Starch is often included to improve strength.

Process improvement is particularly desired in retention, drainage and drying, or de-watering, and in the formation, or structure, properties of the final paper sheet. Some of these parameters are in conflict with each other. For instance if the fibers are flocculated effectively into relatively large conventional flocs, this may trap the fiber fines and filler very successfully, so as to give good retention and a porous structure so as to give good drainage. However, the porosity and large floc size may result in rather poor formation, and the large fiber flocs may tend to hold water during later drying stages such that the drying properties are poor. This will require excessive amounts of thermal energy to dry the final sheet. If the fibers are flocculated into smaller and tighter flocs, drainage will be less satisfactory and retention may be less satisfactory, but drying and formation will be improved.

Conventional practice therefore has resulted in the paper maker selecting additives according to the parameters he judges to be the most important. If, for example, increased filler retention is more important to the papermaker than increased production, a polyacrylamide or other very high molecular weight flocculant may be used. If increased production is more important than increased retention then a coagulant, such as aluminum sulphate, may be chosen. Impurities in the stock create additional problems and necessitate the use of particular additives.

It is conventional to include in the stock an inorganic additive and an organic polymeric material, e.g., for improving retention, drainage, drying and/or formation. The prior art adds one to ten percent bentonite and/or one-half to three percent aluminum sulphate to the stock, followed by two-hundredths to two-tenths percent of a cationic polymer, e.g., polyethylene imine, to improve de-watering in the presence of impurities in the stock. Other prior art processes add bentonite to the stock which may be followed by aluminum sulphate or other acidifying substance. Also, attapulgite can be added and alum and/or auxiliary filler retention material can be incorporated. Sometimes a stock containing alum and pigmentary clay is formed and cationic polymer is added.

There can be a significant variation in the type and amount of clays and other materials used in paper. These non-ink components, after ignition of the paper, are commonly referred to as ash content. For example, in some types of newsprint, ash content is less than one percent, and there is no intentional addition of clays to enhance desired properties. In some paper types a small amount of talc may be used in production to help control pitch deposits. Titanium dioxide may be added to improve gloss and color. In better quality newsprint addition of five percent clay and other materials by overall weight is common and in some cases much more.

The market for pigmented coated papers is growing extremely fast, currently about ten to fifteen percent per year, and it may be predicted that even the lower grades such as newsprint will be coated one way or another in the near future.

It will be evident to those skilled in the applications in this area of pigments and fillers that many more industries will have a use for this invention. To name some, the paint, ink, plastics and laminates industries use such pigments and fillers in significant quantities.

SUMMARY OF THE PRESENT INVENTION

It is therefore an object of the present invention to provide a substitute material for titanium dioxide filler in the making of paper.

It is a further object of the present invention to provide an efficient process for making basic potassium aluminum sulphate from leach liquors of various sulphates.

It is another object of the present invention to provide a process for making paper with basic potassium aluminum sulphate from leach liquors of various sulphates. The BKAS is used as a filler, extended filler and/or pigment in the making of paper.

Briefly, in a process embodiment of the present invention, a leach liquor of $Al_2(SO_4)_3+K_2SO_4+Fe_2SO_4$ and other sulphates is introduced to a surface-cooled crystallizer that drops the $Al_2(SO_4)_3+18H_2O$. The leach liquor is pumped through a heat exchanger that keeps a temperature of 160° F. and the surface temperature of the surface-cooled crystallizer is maintained at 60° F. The temperature gradient within the leach liquor promotes crystal formation. These crystals are then supplied to a mixture which includes $K_2SO_4$ in a simple crystallization and evaporation step that uses a vacuum of twenty inches of mercury and heat to drop $Al_2(SO_4)_3+K_2SO_4+24H_2O$. A pressure of 250 PSI and a temperature of 200° C. are then applied in a discrete continuous process that yields a basic potassium aluminum sulphate and excess potassium sulphate. The excess potassium sulphate is returned to the simple crystallization and evaporation step. The basic potassium aluminum sulphate comprises particles that are at least forty percent below two micron. This is then applied to a delaminator that converts all the particles to under ten micron to submicron size if needed for various filler or pigment substitutes.

An advantage of the present invention is that a process is provided for producing a superior and less expensive titanium dioxide filler and extended filler substitute.

Another advantage of the present invention is that a filler is provided with interfiber bonding related strength properties, such as tensile and burst strength, that are similar to titanium dioxide strength properties.

An advantage of the present invention is that a pigment is provided with an ISO Brightness (direct measurement) of ninety-five to ninety-six percent and ISO Brightness (calculated in zero to ten percent ash range) of ninety-four to ninety-seven percent.

Another advantage of the present invention is that a pigment is provided exhibiting superior pigment retention and is similar to the titanium dioxide retention.

A further advantage of the present invention is that a titanium dioxide filler and extended filler substitute is provided that is ninety-nine percent insoluble from two to ten pH.

Another advantage of the present invention is that a titanium dioxide filler substitute is provided that has a particle size of under two microns.

Another advantage of the present invention is that the BKAS has 3600 to 3900 $cm^2/g$ light scattering coefficient. With further delamination this is expected to increase significantly.

These and other objects and advantages of the present invention will no doubt become obvious to those of ordinary skill in the art after having read the following detailed description of the preferred embodiments that are illustrated in the drawing figure.

IN THE DRAWINGS

FIG. 1 is a diagram of a process for producing basic potassium aluminum sulphate from sulphate leach liquors; and FIG. 2 is a diagram of a process for making paper with fillers of basic potassium aluminum sulphate from sulphate leach liquors that completely eliminate titanium dioxide in the filler.

DETAILED DESCRIPTION OF THE PREFERRED EMBODIMENT

Figure 1:
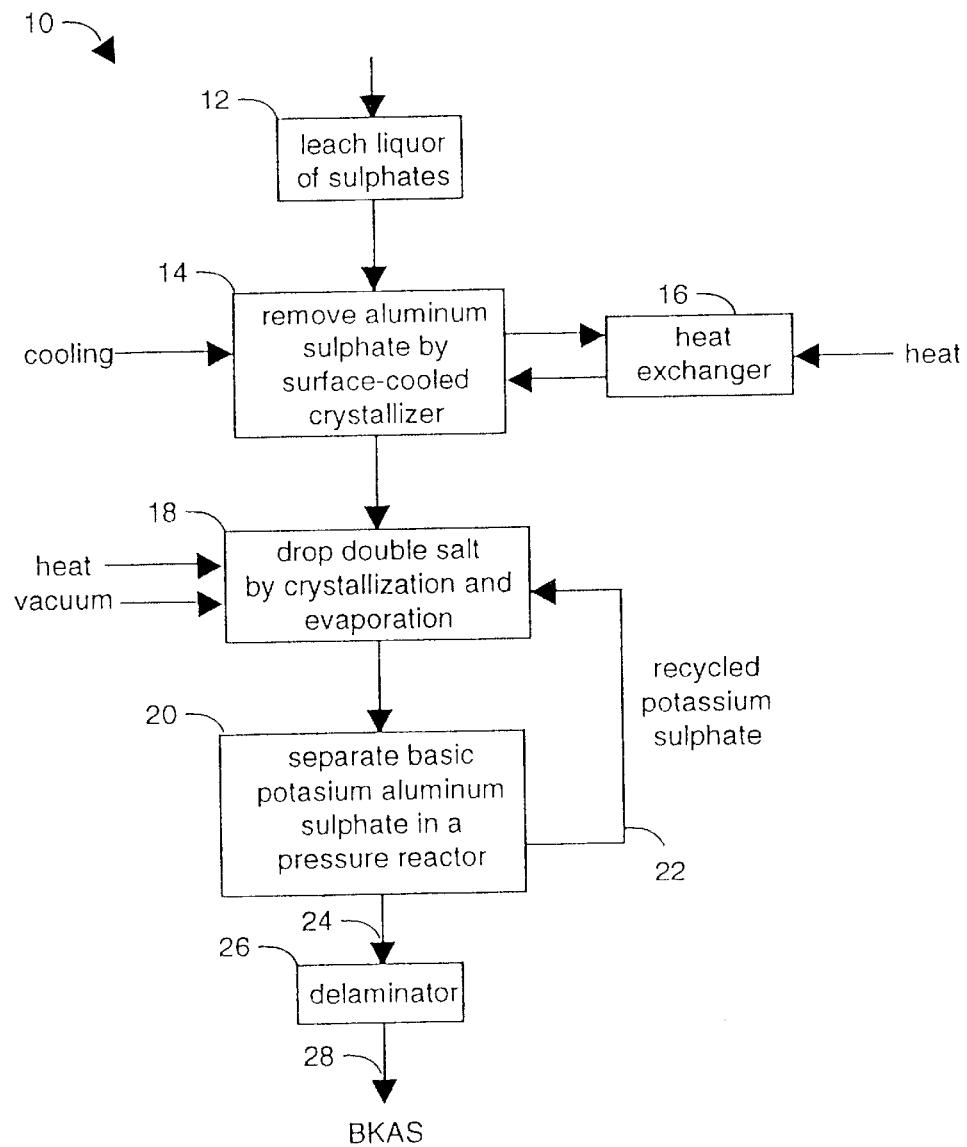

FIG. 1 illustrates a process embodiment of the present invention, referred to herein by the general reference numeral 10. The process 10 comprises starting with a leach liquor 12 of $Al_2(SO_4)_3+K_2SO_4+Fe_2SO_4$ and other sulphates. These are introduced to a surface-cooled crystallizer 14 that precipitates crystals of $Al_2(SO_4)_318H_2O$ that are then removed. The leach liquor is pumped through a heat exchanger 16 that keeps an internal temperature of approximately 160° F. The surface temperature of the surface-cooled crystallizer 14 is maintained at approximately 60° F. For example, the surface-cooled crystallizer 14 may comprise a four-foot diameter twelve-foot high stainless steel tank with a system of chilling pipes that circuit the outside surface.

The surface-cooled crystallizer 14 promotes a supersaturated concentration that causes relatively large and very pure crystals of aluminum sulphate to drop out. A temperature gradient within the leach liquor is contrived thereby to promote such crystal formation. The remaining leach liquor feeds a mixture which includes $K_2SO_4$ in a crystallization and evaporation step 18. A vacuum of twenty inches of mercury and heat combine to evaporate the water and increase the concentration enough to drop a double salt of $Al_2(SO_4)_3+K_2SO_4+24H_2O$. The double salt is then fed to a pressure reactor 20 with a pressure of approximately 250 PSI and a temperature of approximately 200° C.

An excess product of potassium sulphate 22 $K_2SO_4$ is returned to the crystallization and evaporation step 18. The pressure reactor 20 is operated in a discrete continuous process that yields a basic potassium aluminum sulphate (BKAS) 24, chemically, $K_2SO_4$, $3Al_2O_3$, $4SO_3$, $9H_2O$, and the excess potassium sulphate 22 $K_2SO_4$ from the $K_2SO_4+Al_2(SO_4)_3+24H_2O$ mixture. The BKAS 24 comprises particles that are at least forty percent below two micron. The BKAS 24 is then fed to a delaminator 26 that converts all the particles to under two micron by mixing and rubbing with three hundred to four hundred micron size alumina. A fine basic potassium aluminum sulphate (BKAS) 28 is output that has eighty-five percent of its particles under two microns in size.

Process embodiments of the present invention can use conventional paper making apparatus. The thin stock that is drained to form the sheet is often made by diluting a thick stock which typically has been made in a mixing chest by blending pigment, appropriate fiber, any desired strengthening agent or other additives, and water. Dilution of the thick stock can be by means of recycled white water. The stock may be cleaned in a vortex cleaner. Usually the thin stock is cleaned by passage through a centriscreen. The thin stock is usually pumped along the apparatus by one or more centrifugal pumps known as fan pumps. For instance the stock may be pumped to the centriscreen by a first fan pump. The thick stock can be diluted by white water to the thin stock at the point of entry to this fan pump or prior to the fan pump, e.g., by passing the thick stock and dilution water through a mixing pump. The thin stock may be cleaned further, by passage through a further centriscreen. The stock that leaves the final centriscreen may be passed through a second fan pump and/or a head box prior to the sheet forming process. This may be by any conventional paper or paper board forming process.

Finished paper stock can be substantially unfilled, e.g., containing less than ten percent and generally less than five percent by weight filler in the final paper, or filler can be provided in an amount of up to fifty percent based on the dry weight of the stock or up to forty percent based on the dry weight of paper. When filler is used, conventional fillers such as calcium carbonate, clay, titanium dioxide or talc, or a combination, may be substituted by the BKAS 28. The filler is preferably incorporated into the stock in a conventional manner.

The stock may include other additives such as rosin, alum, neutral sizes or optical brightening agents. It may include a strengthening agent and this can be a starch, often a cationic starch. The pH of the stock is generally in the range of four to nine.

The amounts of fiber, filler, and other additives such as strengthening agents or alum can all be conventional. Typically, the thin stock has a solids content of two-hundredths to three percent or a fiber content of one-hundredth to two percent. The stock preferably has a solids content of three-hundredths to one and one-half percent or two percent.

The paper may also be surface treated to improve its properties. An aqueous suspension of pigment particles and binder, similar to a latex house paint, is applied at high speeds typically up to 100 km/h with roll or blade coaters. The paper is then dried and calendered. The finished surface is very smooth, uniform and glossy and gives excellent print quality particularly in multicolor printing.

The binders currently used in pigmented coatings are soluble polymers such as starch or polyvinyl alcohol or latexes based on styrenebutadiene, polyvinyl acetate or acrylic monomers. The synthetic latex binders are not biodegradable. Starch is biodegradable but has poor binding efficiency and is water-sensitive, a problem in multicolor offset printing where water is applied at each station, as well as in water-based gravure or flexographic printing.

Surface treatments and impregnations are applied for reasons other than that of improving print quality. The size-press, and its newer versions, are used to apply a number of chemicals that will change the surface and also the bulk properties of paper. Hydrophobicity, mechanical strength, grease resistance, release properties, friction, flammability, electrical conductivity are examples of properties that can be imparted to paper by such means. See, U.S. Pat. 5,451,456, issued Sep. 19, 1995, to Marchessault, et. al., incorporated herein by reference.

In packaging grade paper, hydrophobicity, non-wetting, water fast and "stiffness-when-wet" property are requirements that are difficult to meet adequately. Usually, petroleum-based resins and waxes are used to obtain the effect, but it is difficult to reach high levels of hydrophobicity and wet-stiffness without also imparting a high level of permanency to the product.

Figure 2:
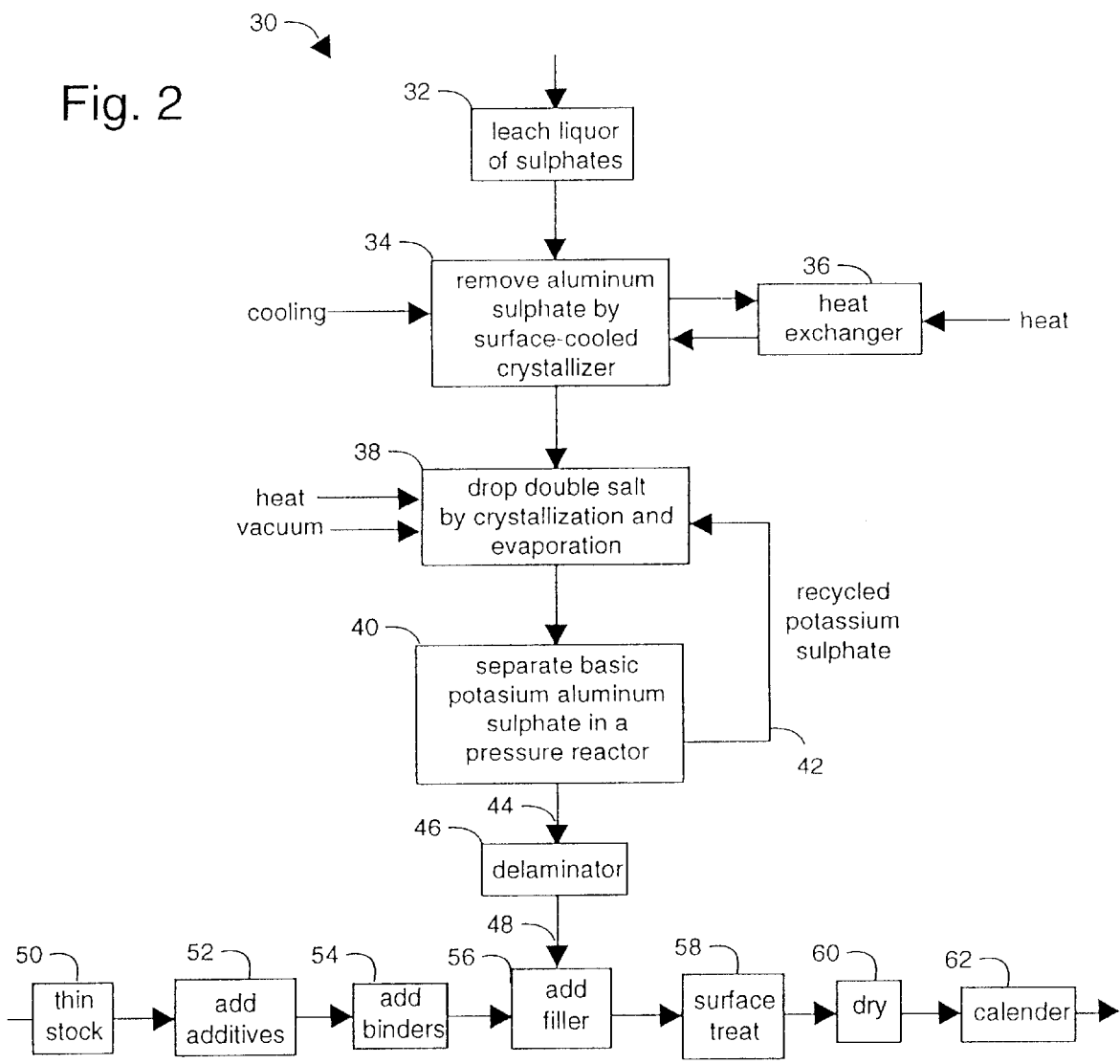

FIG. 2 illustrates a papermaking process embodiment of the present invention, referred to herein by the general reference numeral 30. The process 30 has a filler fabrication branch that is similar to the process 10 and a paper fabrication flow to which the filler is contributed. The process 30 comprises starting with a leach liquor 32 of $Al_2(SO_4)_3+K_2SO_4+Fe_2SO_4$ and other miscellaneous sulphates. These are introduced to a surface-cooled crystallizer 34 that precipitates large, very-pure crystals of $Al_2(SO_4)_3 18H_2O$ that are then removed. The leach liquor is pumped through a heat exchanger 36 that keeps an internal temperature of approximately 160° F. The surface temperature of the surface-cooled crystallizer 34 is maintained at approximately 60° F. For example, the surface-cooled crystallizer 34 may comprise a four foot diameter twelve-foot high stainless steel tank with a system of chilling pipes that circuit the outside surface.

The surface-cooled crystallizer 34 promotes a supersaturated concentration that causes relatively large and very pure crystals of aluminum sulphate to drop out. A temperature gradient within the leach liquor is contrived thereby to promote such crystal formation. The remaining leach liquor feeds a mixture which includes $K_2SO_4$ in a simple crystallization and evaporation step 38. A vacuum of twenty inches of mercury and heat combine to evaporate the water and increase the concentration enough to drop a double salt of $Al_2(SO_4)_3+K_2SO_4+24H_2O$. The double salt is then fed to a pressure reactor 40 with a pressure of approximately 250 PSI and a temperature of approximately 200° C.

An excess product of potassium sulphate 42 $K_2SO_4$ is returned to the simple crystallization and evaporation step 38. The pressure reactor 40 is operated in a discrete continuous process that yields a basic potassium aluminum sulphate (BKAS) 44, chemically, $K_2SO_4$, $3Al_2O_3$, $4SO_3$, $9H_2O$, and the excess potassium sulphate 22 $K_2SO_4$ from the $K_2SO_4+3Al_2(SO_4)_3+24H_2O$ mixture. The BKAS 44 comprises particles that are at least forty percent below two micron. The BKAS 44 is then fed to a delaminator 46 that converts all the particles to under two micron by mixing and rubbing with three hundred to four hundred micron size alumina. A fine basic potassium aluminum sulphate (BKAS) 48 results that has substantially its particles under two microns in size.

The paper fabrication flow comprises starting with a thin stock 50. A step 52 adds conventional papermaking additives to the stock. A step 54 adds conventional papermaking binders to the stock. A step 56 adds the BKAS 48 as a filler to the stock. A step 58 does surface treating and drying occurs in a step 60. Alternatively, the final paper product is calendered according to conventional methods in a step 62.

In alternative embodiments of the above, sodium (Na) may be substituted in whole or part for potassium (K) with substantially similar benefits and results. Such basic sodium aluminum sulfate (BNaAS) is also referred to herein as sodium double salt (SDS). The basic formula for the SDS is $Na_2SO_4$–$3Al_2O_3$–$4SO_3$–$9H_2O$ with a molecular weight of 930.03. The hydrolysis equation is,

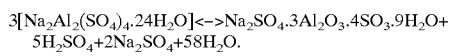

When the SDS was converted to BNaAS, the resulting material exhibited many of the same properties as BKAS. A very high conversion was obtained compared to BKAS (BNaAS, eighty-three percent by weight; BKAS, seventy-five percent by weight). The particle size of the BNaAS was similar to the BKAS. Both the BNaAS and the BKAS required delamination. The solubility of BNaAS is very low, e.g., 0.003 gram per 100 grams of de-ionized water. The solubility of BKAS 0.005 gram per 100 grams of de-ionized water. The BNaAS product was very pure, with the contamination being mainly potassium, e.g., from the BKAS. Any potassium in the reactor will potentially react to form BKAS. The process produced a product with BKAS levels that varied with the potassium level in the sodium alum feed crystals.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for making paper with a filler of basic potassium aluminum sulphate (BKAS) $K_2SO_4$, $3Al_2O_3$, $4SO_3$, $9H_2O$, comprising:

starting with a leach liquor that is essentially saturated with aluminum sulphate $Al_2(SO_4)_3$ and potassium sulphate $K_2SO_4$;

introducing said leach liquor to a surface-cooled crystallizer;

precipitating and removing crystals of aluminum sulphate $Al_2(SO_4)_3 18H_2O$ from said leach liquor in said surface-cooled crystallizer;

precipitating a double salt of $Al_2(SO_4)_3+K_2SO_4+24H_2O$ by concentrating a remainder of said leach liquor with heat, vacuum and evaporation;

reacting said double salt of $Al_2(SO_4)_3+K_2SO_4+24H_2O$ in a heated and pressurized reactor to produce a first basic potassium aluminum sulphate (BKAS) $K_2SO_4$, $3Al_2O_3$, $4SO_3$, $9H_2O$; having a particle size disteibution that includes particles which exceed two microns; and delaminating said first basic potassium aluminum sulfate to produce a second basic potassium aluminum sulfate (BKAS) with particle sizes which do not exceed two microns;

adding said second BKAS to a paper thin stock as a filler.

2. The method of claim 1, wherein:

the delaminating includes the use of a delaminator that rubs three hundred to four hundred micron sized particles of alumina or silica with said first basic potassium aluminum sulphate (BKAS) $K_2SO_4$, $3Al_2O_3$, $4SO_3$, $9H_2O$ and then separates out said BKAS.

3. The method of claim 1, wherein:

said surface-cooled crystallizer comprises a four foot diameter, twelve foot high stainless steel tank with a system of chilling pipes that circuit the outside surface.

4. The method of claim 1, wherein:

the reacting is done at approximately 200° C. and a pressure of approximately 250 pounds per square inch (PSI).

5. The method of claim 1, wherein:

any excess of potassium sulphate that results from the BKAS formation step that is recycled to the step of precipitating said double salt.

6. A method for making paper with a filler of basic sodium aluminum sulphate (BNaAS) $Na_2SO_4$, $3Al_2O_3$, $4SO_3$, $9H_2O$, comprising:

starting with a leach liquor that is essentially saturated with aluminum sulphate $Al_2(SO_4O)_3$ and sodium sulphate $Na_2SO_4$;

introducing said leach liquor to a surface-cooled crystallizer;

precipitating and removing crystals of aluminum sulphate $Al_2(SO_4)_3 18H_2O$ from said leach liquor in said surface-cooled crystallizer;

precipitating a double salt of $Al_2(SO_4)_3+Na_2SO_4+24H_2O$ by concentrating a remainder of said leach liquor with heat, vacuum and evaporation;

reacting said double salt of $Al_2(SO_4)_3+Na_2SO_4+24H_2O$ in a heated and pressurized reactor to produce a first basic sodium aluminum sulphate (BNaAS) $Na_2SO_4$, $3Al_2O_3$, $4SO_3$, $9H_2O$; having a particle size distribution that includes particles which exceed two microns;

delaminating said first basic sodium aluminum sulfate to produce a second basic sodium aluminum sulfate with particle sizes which do not exceed two microns and adding said second BNaAS to a paper thin stock as a filler.

7. The method of claim 1, wherein the precipitating and removing crystals of aluminum sulfate further comprises the steps of:

pumping said leach liquor through a heat exchanger to the surface cooled crystallizer which is in the form of a tank; and suppling the heated leach liquor back from said heat exchanger to maintain a liquid core temperature in said tank of approximately 160° F., while the wall temperature of said tank is maintained at approximately 60° F.

* * * * *